Patented July 17, 1928.

1,677,614

UNITED STATES PATENT OFFICE.

AUGUSTE BOIDIN, OF SECLIN, FRANCE, AND JEAN EFFRONT, OF BRUSSELS, BELGIUM.

PROCESS OF MAKING A SIZE OR DRESSING.

No Drawing.    Application filed February 24, 1925.  Serial No. 11,329.

This invention relates to a process for making a size or dressing.

It has been common in the textile arts to provide threads, yarns, cords, and the like with a starch sizing or dressing, particularly where such textile materials where to be used as warps for woven fabrics. In preparing such sizing or dressing it has been the practice at times to boil ordinary starch, such as that from corn, with water to form a starch paste, to which sometimes was added a fat or fatty substance. Starch preparations so made, however, do not well impregnate the warps, but remain mostly as a coating which frequently peels off. Hence, it has been considered preferable to prepare so-called thin-boiling starches to serve as sizings. These thin-boiling starches have been made by treating suitable starches with acid. Considerable skill and care are necessary in the production of such thin-boiling starches. Their fluidity and power to impregnate the yarn depends upon how far the acid treatment of the starch has been carried. In order to produce thin-boiling starches which have a maximum of penetration the acid conversion would have to go so far as to bring about other disadvantages. While sizings made from such thin-boiling starches are often better than such made from ordinary starch, they are by no means of as good quality as can be produced with our process.

It is the object of the present invention to provide a simple and economical process for the production of such sizing or dressing materials.

By our method the starch product can be prepared in such a way that it will not contain any fermentable sugars, such as maltose or glucose and, if desirable, starch products can be produced which are so low in dextrine that they may be considered as substantially free therefrom.

The product of the invention is a colloidal mass which, when containing about 10% by weight of solids, will, when cooling, form a jelly like mass, the consistency of which depends on the degree of conversion.

The process of the invention, broadly considered, comprises mixing an ordinary raw starch with water, bringing this mixture about to neutrality, then adding a starch-liquefying bacterial enzyme preparation of the types disclosed in United States Patent 1,227,525, heating the mixture rapidly to a temperature varying from about 75° to 100° C., according to the nature of the product to be obtained, and after a time, which varies with the product desired, preventing all further enzyme action by destroying the enzymes, either by heat or by an acid, or both.

In carrying out the invention any suitable raw starch may be employed as the starting material. In the present practice an ordinary starch such, for example, as that derived from corn, or tubers, is very satisfactory. The raw starch, which is usually in a finely comminuted form, or may be put in that form if desired, is mixed with water. If the mixture is not neutral or nearly so, some acid or alkaline material is added to bring the mixture to a neutral or nearly neutral condition. In the usual practice it is best to have the mixture truly neutral or very slightly alkaline, an acid condition being avoided for the sake of safety, although a very slight acidity of the mixture will not prevent the carrying out of the process.

To the mixture is then added a preparation of starch-liquefying bacterial enzymes, the proportionate amount of solution added depending upon the strength of the enzyme preparation and upon the degree of transformation which it is desired to bring about in the starch mixture.

The mixture of water, starch and enzyme solution is then brought quickly to a temperature which may be varied somewhat according to the product finally to be obtained, but which will usually be between 70° and 100° C. It is desirable that the mixture be brought to the desired temperature quickly, if one desires to obtain the new starch product which forms a part of this invention, because if the mixture be brought to the desired temperature too slowly, the product may contain a mixture of various products of hydrolysis, including too high a percentage of reducing sugars and dextrine.

In order to prepare a starch product practically free from reducing sugars and containing a minimum of dextrine, it is convenient to so operate in making the starch product that the conversion temperature will be as high as possible, that is to say, near the boiling point. This may require an increase of the dose of enzymes. If on the contrary one has for an object the preparation of a starch product which is to be used in making a more limpid size or dressing, it is convenient to reduce the proportion of enzymes one-half, or even to a third, and to lower somewhat the temperature chosen, in order to obtain a greater fluidification of the cooked starch.

In varying the temperature, the quantity of the enzymes, and the duration of the heating, one may vary at will and with the greatest ease the characteristics of the starch product and therefore, of the sizing made therefrom.

When one operates at a high temperature toward boiling, that is to say at 97° C. for example, or lower, one utilizes, for example, 1 to 3 parts of enzymatic preparation for 100 parts of ordinary starch, according to the effect to be produced upon the amylaceous material.

If one has in view the preparation of a product suitable for the manufacture of very limpid sizes or dressings, one may either increase the dose of enzymes when working at the higher temperature, such as at 97° C. or may diminish the temperature to about 80° to 90° C. in which case the quantity of enzymes may be between ½ and 2% by weight of the starch to be treated. The duration of the heating may vary from a few minutes to an hour and more. In prolonging it, one may diminish the dose of enzymes below the quantity indicated, on condition that one never puts the enzyme solution in the hot water before the starch is added since this might partially destroy or injure the enzymes. The presence of starch protects the enzymes. The starch jelly and the transformed products of the starch protect for hours the liquefying enzymes, as we have established by experiments. When the heating has been continued for a sufficient time to permit the desired enzyme action, it is then necessary to stop all further action of the enzymes by destroying them. It will be found that the bacterial enzymes are very resistant to heat in the presence of colloids, such as for instance, the conversion products of starch. The destruction of the enzymes may be done in several ways, as for example, by provoking a strong ebullition of the mixture for about 10 minutes or by acidifying the mixture very slightly and then boiling. If acid be used it may be necessary to neutralize the mixture after the acid has acted for a time, which ought not to be less than ¼ hour.

For destroying the enzymes the mineral acids which provoke a rapid hydrolysis of the starch should be used, if at all, only with great care. It is much better to employ organic acids, for example, acetic acid, or salts of mineral acids, such as the alums, sulfate of zinc, of aluminum, phosphatic acids, or their salts. These salts act at the time by their own acidity and their coagulating properties.

The following is an example of the simplest mode of operation for conversion of ordinary starch into a product resembling generally the usual thin boiling starch, the process being such that it can be carried out in a starch sizing or dressing factory, or in a textile factory.

In order to prepare, for example, 100 liters of 15% sizing, 15 kilos of starch are mixed in 25 liters of cold water and to this is added 300 to 500 gms. of the enzyme preparation. This mixture, constituting a milk of starch, is poured slowly into 60 liters of boiling water while maintaining the temperature of 95° to 98° C., during all of the time that the milk of starch is being poured. The source of heat is then cut off for 15 minutes to ½ hour and, to finish, one acidifies with a little acid, acetic acid, for example, and boils.

In order to make size which is particularly well adapted for warp sizing, which is more limpid than the one above described, the following procedure, for example, gives good results; 10 kilos starch are mixed in 25 liters of cold water and to this is added 300 to 500 gms. of the enzyme preparation. This mixture, constituting a milk of starch, is slowly poured into 60 liters water having a temperature of 75° to 80° C., sufficient heating being supplied by steam or otherwise, to keep the temperature between 75° to 80° C. during the addition of the starch milk. The source of heat is then cut off for 15 minutes to ½ hour and to finish one acidifies with a little acid, acetic acid, for example, and destroys the enzyme by sufficient boiling.

If the sizing is to be neutral, the free acid is neutralized either immediately after employing it, or not later than ¼ hour thereafter.

In the above example, it is assumed that the starch and water mixture, prior to adding the enzyme preparation, is about neutral. If it is not, then either acid or alkali is to be added as hereinbefore explained, to bring the said mixture to approximate neutrality.

This process is not restricted only to the use of so-called extracted starches, but can also be used with other starchy materials such as the various flours, for instance, corn flour or tapioca flour.

What is claimed is:

1. The process of producing sizing material, which comprises directly subjecting starch material to the action of a suitable starch-liquefying bacterial enzyme until at least a part of the starch has been liquefied, and then stopping the enzyme action.

2. The process of producing sizing material, which comprises directly subjecting starch material to the action of a suitable starch-liquefying bacterial enzyme until substantially all the starch has been liquefied, and then stopping the enzyme action.

3. The process of producing sizing material, which comprises preparing a mixture of water and starch material, adding a starch-liquefying bacterial enzyme preparation directly thereto, and maintaining the mixture at a conversion temperature until at least a part of the starch has been converted, and thereupon submitting the mixture to a treatment to stop the enzyme action.

4. The process of producing sizing material, which comprises preparing a mixture of water and starch material, adding a suitable reagent to remove any appreciable acidity or alkalinity of the mixture, adding a starch-liquefying basterial enzyme preparation to the mixture, and maintaining the mixture at a temperature from about 70° C. to below 100° C. until at least a part of the starch has been converted, and thereupon submitting the mixture to a treatment to stop the enzyme action.

5. The process of producing sizing material, which comprises preparing a mixture of water and starch material, adding a starch-liquefying bacterial enzyme thereto, quickly bringing the mixture to a temperature between 70° and 98° C., maintaining the mixture at a temperature between these limits until at least a part of the starch has been converted, and thereupon submitting the mixture to a treatment to stop the enzyme action.

6. The process of producing sizing material, which comprises preparing a mixture of water, starch and starch-liquefying bacterial enzymes, pouring this mixture into hot water, maintaining this mixture at a temperature not less than 70° C. and below 100° C., until at least a part of the starch has been converted, and thereupon submitting the mixture to a treatment to stop the enzyme action.

7. The process of producing sizing material, which comprises preparing a mixture of water and starch material, adding a starch liquefying enzyme produced by bacteria of the species *subtilis* or *mesentericus* thereto, and maintaining the mixture at a conversion temperature until at least a part of the starch has been converted, and thereupon submitting the mixture to a treatment to stop the enzyme action.

8. The process of producing sizing material, which comprises preparing a mixture of water and starch material, adding a starch liquefying enzyme produced by bacteria of the species *subtilis* or *mesentericus* thereto, quickly bringing the mixture to a temperature between 70° and 98° C., maintaining the mixture at a temperature between these limits until at least a part of the starch has been converted, and thereupon submitting the mixture to a treatment to stop the enzyme action.

In testimony whereof, we have hereunto set our hands.

AUGUSTE BOIDIN.
JEAN EFFRONT.